Aug. 28, 1962 R. A. GULICK 3,051,434
BACK SEATING FOR VALVE STEMS
Filed Jan. 9, 1959 2 Sheets-Sheet 1

Ronald A. Gulick
INVENTOR.

By Russell E. Schloff
ATTORNEY

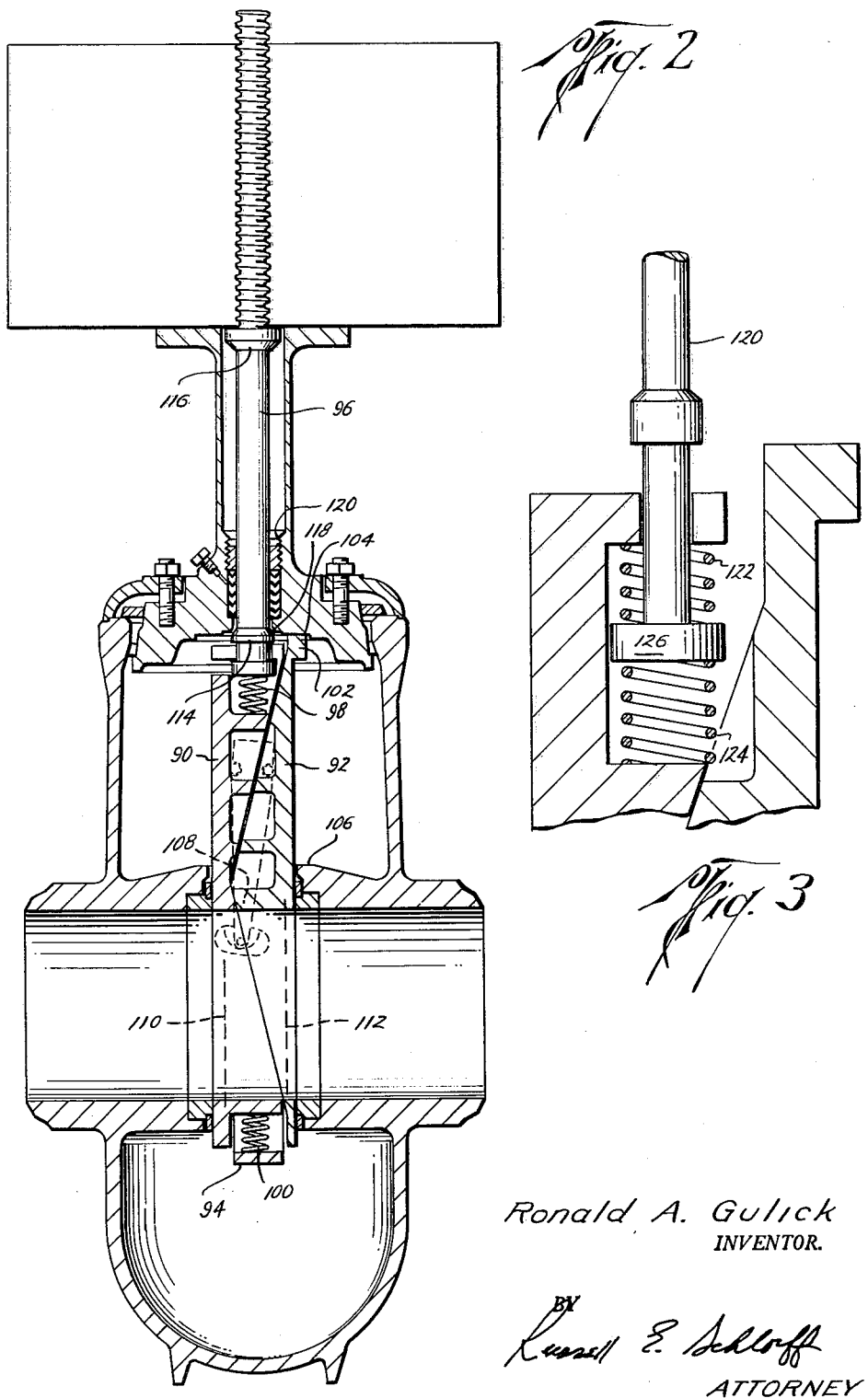

United States Patent Office 3,051,434
Patented Aug. 28, 1962

---

3,051,434
BACK SEATING FOR VALVE STEMS
Ronald A. Gulick, Houston, Tex., assignor to ACF Industries, Incorporated, New York, N.Y., a corporation of New Jersey
Filed Jan. 9, 1959, Ser. No. 785,919
3 Claims. (Cl. 251—167)

This invention relates to the back seating of the stem of a through conduit wedge gate valve. A through conduit gate valve is one which when fully opened presents a uniform, smooth wall, unbroken passageway therethrough.

More particularly, the invention relates to the back seating of the stem of valves which have an expansible, sectional, double-wedging gate valve assembly, such as shown in United States patents to M. P. Laurent Reissue No. 20,101, dated September 8, 1936, and 2,583,512, dated January 22, 1952, and to other similar types of expansible, wedge gate valve assemblies. In such assemblies, there are two gate sections provided with complementary, opposed, inner faces, each formed with two angularly related surface portions that diverge transversely of the assembly (i.e., in the direction of the flow through the valve) to form two sets of wedging surfaces. Either set of these wedging surfaces is effective, upon appropriate displacement between the two sections, from a centered relative position corresponding to the minimum overall transverse dimension of the assembly (i.e., wherein the apexes of the inter-diverging faces are aligned) to expand the gate assembly normally against the valve seats. One set of wedging surfaces is employed, by causing relative displacement between the two gate sections in one direction, to expand the gate assembly as it moves into valve closing position and so provides a tight seal between the gate assembly and the valve seats, and between the two gate sections. The other set of wedging surfaces is employed, by causing relative displacement between the two gate sections in the opposite direction, to similarly tightly seal the valve, as the assembly moves into the open position. The two gate sections are moved together as a unit between open and closed positions of the valve by a conventional valve stem connected to one of the sections. Stops are provided for the other, or floating, gate section at both ends of travel of the assembly, so that continued movement of the stem-connected section toward the end of the travel of the assembly causes the aforesaid relative displacement between the two sections in order to seal the valve in both its open and closed positions.

Such assembly permits a uniform, smooth wall, unbroke passageway through the valve whereby turbulence is maintained at a minimum. Also, the valve chamber is isolated from the passageways in both the fully open and fully closed positions.

In handling critical fluids, such a construction is desirable; however, it is often necessary to have an independent stem seal at the limits of the stem travel means, which construction also permits the repacking of the valve while it is in the line. In order to change the packing, it is most desirable to have means to independently restrain the pressure in the valve chamber from reaching the packing. One method of doing this is to have a protuberance on the valve stem which mates with a seat in the valve bonnet. Such construction in a rising stem gate valve is shown in Churchill Patent 855,385, dated May 28, 1907. A similar construction for non-rising stem valves is shown in the Neuhaus Patent 1,954,643, dated April 10, 1934. However, as previously mentioned, the relative displacement of the gate assembly occurs by the floating section of a gate assembly contacting a stop which arrests any further movement of this section so that continued movement of the stem connecting section toward the end of travel causes relative displacement of the two sections to force the faces of the valve into intimate contact with the valve seats, thereby effecting a seal. Heretofore, there had been no known means of effecting a back seat for such type valve. The present invention is directed to the provision of means whereby a through conduit, expansible, wedge type, reciprocating gate valve is provided with means which establish a back seat on the stem enabling the packing to be changed while the valve is in the line. In addition to facilitating changing packing, the back seating of the stem provides an independent seal around the stem which is particularly desirable in the handling of critical fluids and also provides a means of sealing around the stem where the temperature range is above that of any desirable packing.

It is the primary object of the present invention to provide a through conduit, expansible type gate valve which is provided with an independent seal around the stem.

It is another object of the present invention to provide a through conduit, expansible type gate valve with means which will permit the changing of packing while the valve is in the line.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIG. 2 is a view corresponding to FIG. 1 in which the valve is provided with means to effect a back seat in both the open and closed positions.

FIG. 3 is a fragmentary sectional view showing an alternate construction for the valve shown in FIG. 2.

Figures 1, 4:
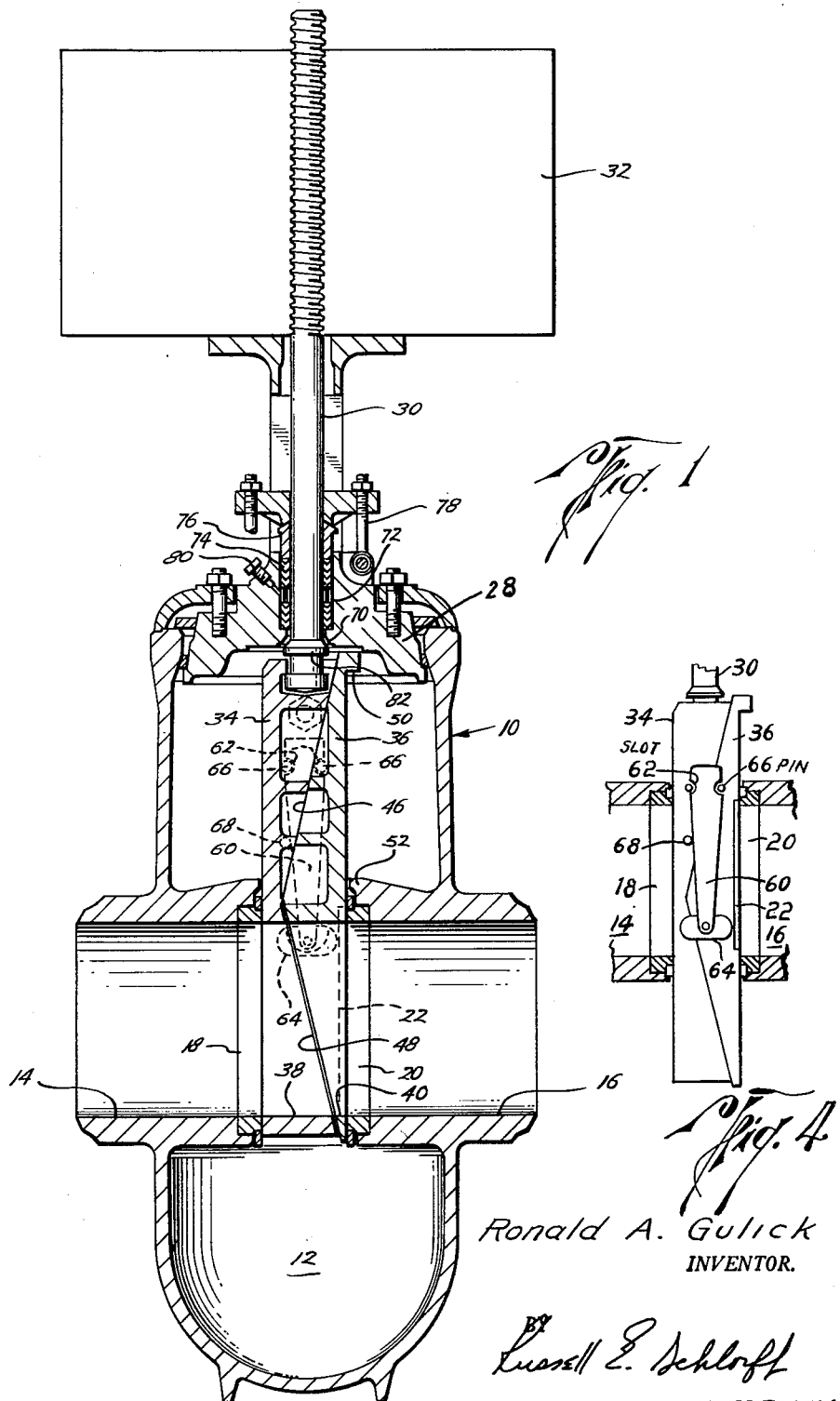
FIG. 1 is a transverse, vertical, sectional view through a rising stem gate valve having a double wedging, expansible gate assembly embodying this invention. The valve is shown in the open position with the stem effecting a back seat with a seat in the bonnet.
FIG. 4 is a diagrammatic sketch of the central section of the valve showing the centralizing mechanism.

Referring now to the drawings, there is shown in FIG. 1 a through conduit gate of the rising stem type, having a housing 10 provided with an interior valve chamber 12 in which is housed the gate mechanism of the valve. Aligned ports 14, 16 in opposite walls of the housing 10 are provided with parallel, preferably removable, flat faced valve seats 18, 20. These seats are mounted in recesses in the inner end of the ports. One seat may be provided with a pair of side flanges 22. The seats and side flanges serve to confine and guide the gate assembly for substantially rectilinear movement in opening and closing of the valve. The upper portion of the housing is formed of a bonnet 28 through which extends the valve stem 30. The stem is threadingly connected to a motor operator 32 or may be attached to any other conventional means which produces axial movement of the stem 30 as is well known in the art.

The ported gate assembly which slides rectilinearly between the seats 18 and 20 is formed in two sections, one hereinafter termed the gate 34 and the other the segment 36. Both sections have ports 38 and 40 which in the open position of the valve, as shown in FIG. 1, are aligned with the housing ports 14, 16 to provide a uniform, smooth wall, unbroken passageway for unobstructed flow of fluids. The lower or inner end of the valve stem 30 is detachably connected to the upper or adjacent end of the gate 34, preferably by a T-head and slot connection. Hence, the axial movement of the stem 30 raises and lowers the gate assembly to open and close the valve. The gate and segment have flat outer faces disposed parallel to their flat valve faces for sealing engagement therewith. It is obvious however that the sealing faces of the two sections of the gate assembly and their corresponding valve seats may be complementary arcuate, or other suitable shape, in horizontal section, i.e., perpendicular to the valve stem, so long as such surfaces extend parallel to the movement of the valve assembly.

The inner opposed faces of the gate and segment are formed with two complementary, angularly-related surface portions that diverge from the midpoints of the gate and segment to provide two sets of wedging surfaces 46, 48. When both sets of these wedging surfaces are in contact, the overall transverse dimension of the gate assembly (i.e., normal to the valve seat) is slightly less than the distance between the valve seats. Hence, the two assembly sections can be displaced to a limited extent, relative to each other, in directions parallel to the movement of the gate assembly. While the gate assembly may be expanded at both extremes of movement by the action of one of the said wedging surfaces 46, 48 which forces the outer faces of the gate and segment into tight sealing engagement with their respective valve seats, it was found that by only expanding in the closed position it is possible to incorporate the back seating feature which permits packing of the line under pressure. Relative displacement is imparted to the gate and segment when the projection 50 on the segment 36 contacts with the fixed abutment 52 which stops further movement of the segment 36 while the gate 34 continues to be moved by the valve stem 30. Hence, the gate assembly is forcibly expanded and the valve sealed in the closed position by the wedging surfaces 46.

In moving the assembly from either the open or the sealed closed position to the other end of its travel, initial movement of the valve stem 30 imparts movement only through the gate 34 while the segment 36 remains stationary. This initial relative displacement between the two assembly sections immediately relieves the expansive forces imparted to the assembly by that set of wedging surfaces which sealed the valve in the closed position. Hence, the gate assembly is freed for movement toward the other end of its travel. In a valve of this type, however, forces frequently exist which retard movement of the segment 36. Thus, the segment may stick to its valve seat 20 because of a long period of disuse, or, if a large positive pressure differential exists between the valve chamber, or the gate side of the line, and the segment side of the line, the segment is pressed tightly against the seat. Such differential may occur either when the valve is closed and the pressure in the valve chamber is greater than in the segment side of the line, or when the valve is being closed or opened against pressure on the gate side of the line; i.e., the gate side of the line is the upstream line. Hence, means must be provided to prevent additional relative displacement between the gate and the segment sufficient to cause the other set of wedging surfaces to forcibly expand the assembly before the latter reaches the end of travel. The previously mentioned M. P. Laurent Patent 2,583,512, describes a centralizing mechanism which is used to accomplish this function.

Essentially, the centralizing construction consists of a long, generally triangular lever 60 which has substantially aligned slots or notches 62 in opposite edges of the wider end thereof and the narrow end is provided with a pivotally connected guiding shoe 64. Opposite sides of the slots 62 are parallel and extend substantially normal to the movement of the assembly. The lever 60 is connected to the assembly by headed pins 66 which extend snugly through slot 62 closely adjacent the inner ends of the latter and which are inserted with a press fit into corresponding bores in the gate 34 and the segment 36, respectively. Obviously, rotational movement of the lever 60 from the centering position by either of the pins 66 at a fulcrum point will effect wedging displacement between the gate and segment. As long as the guiding shoe 64 contacts the flange 22, it cannot move to permit rotational movement of the lever 60 from the centering position. However, once the guiding shoe is past the flange and is no longer restrained and movement of the segment 36 is restrained by the stops, it will then move to one side permitting the gate to expand. Pin 68 restrains movement to the other side.

The bonnet is provided with a seat 70, which if desired may be hard faced, coaxial with the passageway through the bonnet. Outward of the seat 70 is a packing box 72 in which is located the packing 74. A packing gland 76 held in position by bolts 78 maintains the packing in position. A fitting 80 is provided to replenish the plastic packing located between the packing rings. The stem 30 is provided with a protuberance 82.

Upon full upward movement of the gate assembly, the protuberance 82 will contact and mate with the seat 70, thereby establishing an independent seal which will prohibit the fluid in the valve chamber from entering the packing box 72. This independent seal assures that there will be no leakage around the stem while the valve is on flow. The stem seal thereby established permits changing of packing while on flow. The fitting 80 can be backed off to make certain that the seal has been fully established and relieve any pressure that has been built up. Once it is ascertained that a seal is established, the packing gland 76 is removed which will expose the packing 74. Even though the gate assembly does not expand in the open position, the slight space between the gate and segment will not materially effect the flow characteristics. Moreover, the inclusion of the back seating feature does not in any way interfere with the full expansion of the gate assembly in the closed position nor the incorporation of a centralizing mechanism to eliminate premature expansion with resultant drag. Accordingly, the valve is provided with an independent stem seal and can be safely repacked under pressure without the loss of the numerous advantages of an expansible, wedge, through conduit gate assembly.

If it is desirable to have an independent stem seal in both the fully open and fully closed position, the form shown in FIG. 2 can be utilized. In this form, the valve except for the gate, seat flanges, stem and stem seats is similar to that shown in FIG. 1. The gate assembly has a gate section 90 and a segment 92. As previously described, the gate and segment have faces which mate with their respective seats and a double wedge which causes the gate assembly to expand as a unit at extremity of travel. The gate assembly is contained in a carrier 94 to which an operating stem 96 is attached. Interposed between the ends of the carrier 94 and the gate 90 are springs 98 and 100. The segment 92 has a stop 102 which strikes a fixed abutment 104 at the upper end of travel of the gate assembly and a fixed abutment 106 at the lower end of travel. As previously described in connection with FIG. 1, when the segment 92 is stopped, the gate 90 continues to move and such movement causes expansion of the gate assembly. The gate assembly is provided with a centralizing mechanism 108 previously described in connection with FIG. 1. In this case, there are flanges 110 and 112 on each valve seat which act as guide rails for the shoe of the centralizing mechanism. The stem 96 is provided with two protuberances 114 and 116 which, similar to the protuberance 82 of FIG. 1, form an independent seat for the stem. The protuberances mate with seats 118 and 120 which are located in the bonnet, respectively.

In operation, when the stem 96 moves upward, the shoe of the centralizing mechanism 108 is held centered by the guide rails 110 and 112, and as a consequence the gate assembly is collapsed. As the stop 102 on the segment 92 strikes the abutment 104, further travel of the segment is restrained. At the same time, the shoe of the centralizing mechanism 108 has reached the end of the flange 110 and is permitted to move. Further upward movement of the stem causes the gate assembly to expand. After the gate assembly has been expanded, further movement of the stem 96 will cause the cage to overcome the resistance of the spring 100, permitting the protuberance 114 to mate with its seat 118, thereby assuring a stem seal independent of the seat formed by the gate assembly. Therefore, for critical fluids, when escape of such fluid to the atmosphere is to be prevented, an independent seal is formed without impairing the advantages of the through conduit valve. As in the case of the valve previously described, the packing can be changed while the valve is on flow. Likewise, for the closed position of the valve, further movement of the stem 96 after the valve is closed will overcome the resistance of the spring 98 and permit the protuberance 116 to mate with its seat 120 providing an independent stem seal for the valve in the closed position.

If desired, instead of the cage construction shown in FIG. 2, a stem 120 having protuberances for mating with seats in the bonnet similar to stem 96 of FIG. 2 can be connected directly to the gate section as in FIG. 3 and springs 122 and 124 positioned on either side of a shoulder 126. The construction shown in FIG. 3 will operate in a manner similar to the device shown in FIG. 2, that is, the gate assembly will travel as a unit between open and closed position and expand at the extremity of travel. After the gate assembly has been expanded at either end of its travel, further movement of the stem 120 will cause the shoulder 126 to overcome the resistance of either spring 122 or 124 depending upon direction of travel permitting one of the protuberances on the stem to contact the seat in the bonnet and effect a seal. As with the construction in FIG. 2, a stem seal may be provided either in the open or closed position.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A through conduit wedge gate valve provided with means to enable a formation on the stem extending from the gate to establish a seal with a seat in the bonnet, said valve comprising: a housing having aligned flow passages and a valve chamber interposed between said passages, a reciprocating wedge gate valve assembly positioned in said chamber, said valve assembly having a portion covering said passages in the closed position and a portion having a passage which aligns with said passages in the open position, said valve assembly provided with means which laterally expand the assembly in the closed position and means which laterally contract the assembly during movement of the assembly, said assembly contained in a carrier, a stem attached to said carrier, a passage in the body to receive said stem, a packing assembly in the passage around said stem, a seat in the passage prior to said packing, a protuberance on said stem which mates with said seat to seal the valve chamber from the packing, spring means between the carrier and gate assembly which permits additional travel of the stem after full expansion of the gate assembly enabling the protuberance to effect a seal with its seat.

2. A through conduit wedge gate valve provided with means to enable a formation on the stem extending from the gate to establish a seal with a seat in the bonnet, said valve comprising: a housing having aligned flow passages and a valve chamber interposed between said passages, a reciprocating wedge gate valve assembly positioned in said chamber, said valve assembly having a portion covering said passages in the closed position and a portion having a passage which aligns with said passages in the open position, said valve assembly provided with means which laterally expand the assembly in the closed position and means which laterally contract the assembly during movement of the assembly, said assembly contained in a carrier, a stem attached to said carrier, a passage in the body to receive said stem, a packing assembly in the passage around said stem, a seat in the passage prior to said packing, a second seat in the passage outward of said packing, two protuberances on said stem one of which mates with said seat prior to the packing to seal the valve chamber from the packing, and the other which mates with the second seat to effect a seal in the closed position, spring means between the carrier and gate assembly which permits additional travel of the stem after full expansion of the gate assembly enabling one or the other of the protuberances to effect a seal with its seat.

3. A through conduit wedge gate valve provided with means to enable a formation on the stem extending from the gate to establish a seal with a seat in the bonnet, said valve comprising: a housing having aligned flow passages and a valve chamber interposed between said passages, a reciprocating wedge gate valve assembly positioned in said chamber, said valve assembly having a portion covering said passages in the closed position and a portion having a passage which aligns with said passages in the open position, said valve assembly provided with means which laterally expand the assembly in the closed position and means which laterally contract the assembly during movement of the assembly, a stem attached to said assembly, a passage in the body to receive said stem, a packing assembly in the passage around said stem, a seat in the passage prior to said packing, a second seat in the passage outward of said packing, two protuberances on said stem one of which mates with said seat prior to the packing to seal the valve chamber from the packing, and the other which mates with the second seat to effect a seal in the closed position, spring means between the stem and gate assembly which permits additional travel of the stem after full expansion of the gate assembly enabling one or the other of the protuberances to effect a seal with its seat.

References Cited in the file of this patent

UNITED STATES PATENTS

| | | |
|---|---|---|
| 1,389,474 | Anderson | Aug. 30, 1921 |
| 2,049,516 | Ruhstorfer | Aug. 4, 1936 |
| 2,479,124 | Laurent | Aug. 16, 1949 |
| 2,482,409 | Fowler | Sept. 20, 1949 |
| 2,583,512 | Laurent | Jan. 22, 1952 |
| 2,598,224 | Clonts | May 27, 1952 |
| 2,601,304 | Lane | June 24, 1952 |
| 2,758,813 | Anderson | Aug. 14, 1956 |
| 2,922,615 | McInerney | Jan. 26, 1960 |